United States Patent
Gentner et al.

(10) Patent No.: US 7,295,782 B2
(45) Date of Patent: Nov. 13, 2007

(54) CONTROL METHOD AND OPTICAL DATA TRANSMISSION PATH FOR COMPENSATING CHANGES IN SRS-INDUCED POWER EXCHANGE

(75) Inventors: Guido Gentner, Munich (DE); Anton Schex, Germering (DE); Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 514 days.

(21) Appl. No.: 09/682,331

(22) Filed: Aug. 21, 2001

(65) Prior Publication Data

US 2002/0044317 A1    Apr. 18, 2002

(30) Foreign Application Priority Data

Aug. 21, 2000 (DE) .................. 100 40 790

(51) Int. Cl.
*H04B 10/00* (2006.01)

(52) U.S. Cl. ................. 398/160; 398/173; 398/177

(58) Field of Classification Search .............. 398/37, 398/38, 173–181, 158–161; 359/333, 334, 359/337, 337.1, 337.2, 341.3, 341.4, 341.41, 359/341.42

See application file for complete search history.

(56) References Cited

U.S. PATENT DOCUMENTS

| | | | |
|---|---|---|---|
| 5,664,131 A * | 9/1997 | Sugiya | ............ 359/337.13 |
| 5,847,862 A | 12/1998 | Chraplyvy et al. | |
| 6,055,092 A | 4/2000 | Sugaya et al. | |
| 6,088,152 A | 7/2000 | Berger et al. | |
| 6,246,514 B1 * | 6/2001 | Bonnedal et al. | ...... 359/341.41 |
| 6,344,914 B1 * | 2/2002 | Shimojoh et al. | ............. 398/17 |
| 6,344,922 B1 * | 2/2002 | Grubb et al. | ............... 359/334 |
| 6,400,497 B1 * | 6/2002 | Suzuki et al. | .......... 359/337.11 |

FOREIGN PATENT DOCUMENTS

EP           1130822          9/2001

OTHER PUBLICATIONS

Srivastawa et al., "Fast Link Control Protection of Surviving Channels in Multiwavelength Optical Networks", IEEE Photonics Technology Letters, vol. 9, No. 12, Dec. 1997, pp. 1667-1669.
Motoshima et al., "Dynamic Compensation of Transient Gain Saturation in Erbium Doped Fiber Amplifiers by Pump Feedback Control", IEEE Photonics Technology Letters, vol. 5, No. 12, Dec. 1993, pp. 1423-1426.
Plaats et al., "Dynamic Pump Loss Controlled Gain Locking System for Erbium-Doped Fiber Amplifiers in Multi-Wavelength Networks", ECOC 97, Sep. 22-25, 1997, Conference Publication No. 448, pp. 127-130.
Zirngibl, "Analytical model of Raman gain effects in massive wavelength division multiplexed transmission systems", Electronics Letters, Apr. 16, 1998, vol. 34, No. 8, pp. 789, 790 and 823.
Electron Lett. vol. 34, pp. 789-790, 1998 M. Zirngibl, "Analytical model of Raman gain effects in massive wavelength division multiplexed transmission systems".

* cited by examiner

*Primary Examiner*—Agustin Bello
(74) *Attorney, Agent, or Firm*—Bell, Boyd & Lloyd LLP

(57) ABSTRACT

Control method and optical data transmission path having a device for determining the tilting of the spectrum, and having a quick control and slow control for compensating the tilting of the spectrum.

16 Claims, 4 Drawing Sheets

CONTROL METHOD AND OPTICAL DATA TRANSMISSION PATH FOR COMPENSATING CHANGES IN SRS-INDUCED POWER EXCHANGE

BACKGROUND OF THE INVENTION

The present invention relates to a control method for compensating changes in the SRS-induced power exchange when connecting channels into, and disconnecting them from, a continuous optical data transmission path of a WDM system by influencing the tilting of the spectrum. Furthermore, the present invention relates to an optical data transmission path having a WDM system with a multiplicity of data transmission channels of different frequencies with at least one multiplexer, arranged at the beginning, for combining the data transmission channels, one demultiplexer arranged at the end, for separating the data transmission channels, and at least one path section, arranged therebetween, having capabilities for determining and compensating the spectral tilting of transmitted data signals.

It is known that stimulated Raman scattering (SRS) leads to a power exchange between the individual wavelength channels of a wavelength multiplex system (WDM system). Channels with relatively large wavelengths experience an increase in their medium power here, while the average power of channels with relatively small wavelengths decreases. This effect of SRS can be counteracted in the steady state of a data transmission path with WDM system by "tilting" the gain spectrum of an erbium-doped fiber amplifier (EDFA), for example using mechanically controllable filters, as is known from the U.S. Pat. No. 5,847,862. However, a problem here is the time when channels are connected or disconnected during operation.

Another is the failure of individual channels. Both the controllable filters and the erbium-doped fiber amplifiers are too slow in their reaction in order to be able to react quickly to the rapid intensity changes resulting from the connection and disconnection of individual channels or of a number of channels. Thus, during the transmission of data, time periods in which the noise/signal ratio is too low and the bit error rate of at least individual channels rises occur repeatedly. This leads then to a reduced data rate in these data transmission paths.

An object of the present invention is, therefore, to develop a method and a device which permit quicker compensation of the tilting of the spectrum during the connection or disconnection of channels, or when channels fail, in a data transmission path with WDM system.

SUMMARY OF THE INVENTION

The inventors of the present invention have recognized that it is possible to compensate the short-term and small intensity fluctuations in a data transmission path which lead to a change in the tilting of the transmitted spectrum of the data signals in the data transmission path by virtue of the fact that one or more filling lasers are used to compensate these intensity fluctuations immediately, and a "sneaking away" of this change by the filling laser then takes place slowly in such a way that the existing slow compensation mechanisms of the tilting can be compensated. It is not necessary here for the original spectrum of the data signals to be retained, but rather it is sufficient if the overall intensity remains within a specific bandwidth of approximately 100 nm, and the full laser is maintained in this region, which can be located differently depending on the property of the fiber used. For this wavelength dependence, reference is made to M. Zirugibl, "Analytical model of Raman gain effects in massive wavelength division multiplexed transmission systems", Electron. Lett., Vol. 34, pp. 789-790, 1998.

In accordance with these inventive ideas described above, the inventors of the present invention propose to improve the known control method for compensating changes in the SRS-induced power exchange when connecting channels into, and disconnecting them from a continuous optical data transmission path of a WDM system by influencing the tilting of the spectrum, to the effect that the tilting is brought about via at least two systems which operate at different speeds. Therefore, at least one quicker system is measuring a change in the overall power in the optical data transmission path and compensating the tilting by changing the power of an injected filling light source. Filling light source within the terms of the present invention is to be understood as any energy-supplying light source which amplifies an optical signal. In particular, this may be a filling laser or a broadband light source, for example a white light source whose spectrum is, if appropriate, constricted by a filter.

In one particularly advantageous embodiment of the method of the present invention, a time delay is generated in the signal in the optical path between measurement of the overall power and injection of the filling light source so that the reaction time between the measurement of the overall intensity and the response of the filling light source is compensated.

According to the present invention, this control method can be applied together with a slow method for influencing the tilting of the spectrum via controllable filters or power-controlled EDFAs.

In addition, it is advantageous if the quickly operating system firstly compensates changes quickly for influencing the tilting and then returns slowly to the original state, the more slowly operating system performing this compensation.

The filling laser can be injected at the start of the optical transmission path, or else at the end of the optical transmission path and injected counter to the direction of transmission.

It is particularly advantageous to use at least two filling light sources or filling lasers instead of one filling light source or filling laser. This makes it possible to compensate not only the tilting but also the change in the Raman gain averaged over all the signals.

If the entire bandwidth used exceeds 100 nm, it is necessary to ensure that the power remains constant in subbands which each have a bandwidth of less than 100 nm. To do this, a correspondingly larger number of filling lasers must be used and the overall power per subband measured, it being possible to use monitor diodes which measure the power in one subband each. The subbands here must in total cover the entire wavelength range used. It is advantageous if the subbands overlap.

Of course, it is also possible if, for example, the data transmission path is composed of a number of path sections which are not transparent with respect to one another, to use the method described above for each individual path section.

In accordance with the method described above, the inventors of the present invention also propose to supplement an optical data transmission path having a WDM system with a multiplicity of data transmission channels of different frequencies with at least one multiplexer, arranged at the beginning, for combining the data transmission channels, one demultiplexer arranged at the end, for separating the data transmission channels, and at least one path section, arranged therebetween, having capabilities for determining and compensating the spectral tilting of transmitted data signals in such a way that provisions are made which are assigned to at least one path section for indirectly or directly measuring the overall intensity of the transmitted light signal, one or more controlled filling light source or sources for injecting light power into at least one path section, and further provisions are made for controlling the power of the filling laser in order to compensate power fluctuations of the overall intensity of the data signal.

Here, one advantageous embodiment includes arranging the provisions for indirectly or directly measuring the overall intensity of the transmitted light signal and the controlled filling laser for injecting light power at the beginning of a path section, preferably at the beginning of the entire data transmission path.

Furthermore, it is possible for a delay element to be arranged between the provisions for measuring the overall intensity and the filling light source or sources, which delay element may be, for example, a dispersion-compensating fiber (DCF) which is used in the data transmission path and in the booster.

The present invention also includes equipping an optical data transmission path with a control device which is suitable for carrying out the control method described above. This also may, in particular, include a microprocessor with suitable data memories and program memories, it being possible to provide programming for carrying out the method according to the present invention. However, a corresponding analog control which is more costly also lies within the scope of the present invention.

In one further advantageous embodiment of the optical data transmission path according to the present invention, it is possible to provide for the at least one frequency of the filling light source or of the filling laser to be located within the transmitted wavelength band of the transmitted data signals. A filling laser can preferably have a single frequency.

As already mentioned in the control method, the provisions for compensating the spectral tilting of transmitted data signals can have controllable frequency-dependent filters or power-controlled EDFA.

Furthermore, one particularly advantageous embodiment of the optical data transmission path can be provided in which the provisions for determining the spectral tilting of transmitted data signals in the path sections have at least one filter or amplifier with frequency-dependent transmission characteristic or gain characteristic and downstream overall intensity meters, including an evaluation unit for determining the tilting. For this particular embodiment of the measuring device and method of measuring the tilting of the spectrum, reference is made to the simultaneously submitted patent application by the applicant with the title "Verfahren und Vorrichtung zur Bestimmung und Kompensation der Verkippung des Spektrums in einer Lichtleitfaser einer Datenubertragungsstrecke" [Method and device for determining and compensating the tilting of the spectrum in an optical waveguide of a data transmission path], and its disclosed contents with respect to the measuring method of the tilting are incorporated fully.

Additional features and advantages of the present invention are described in, and will be apparent from, the following detailed description of the invention and the figures.

DETAILED DESCRIPTION OF THE INVENTION

Figure 1:
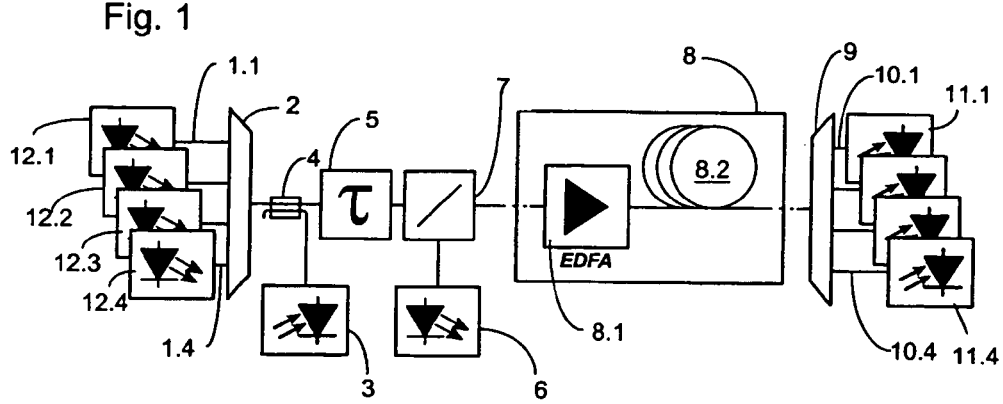
FIG. 1 shows a schematic view of the present invention with reference to an optical data transmission path.

FIG. 1 shows a schematic view of an embodiment of an optical data transmission path according to the teachings of the present invention. Here, a multiplicity of data transmission channels 1.1 to 1.4 are combined via a multiplexer 2. A constant extracted part of the overall intensity of the transmitted light power is then measured in a monitor 3 via a coupler 4. In accordance with the result of the intensity measurement, a filling laser 6, which is operated at a medium power level if no quick compensation measures are necessary, that is to say in the steady state, is controlled so as to perform initial compensation of the power fluctuations on the basis of the power fluctuations measured. The power of the filling laser 6 is injected downstream of a time delay element 5 in the direction of transmission via a wavelength-selective coupler 7. This is then followed by a generally known path section 8 of a data transmission path with a tilting control via a power-controlled EDFA 8.1 and the transmission fiber 8.2 which spans the actual subsequent distances. A demultiplexer 9 finally separates the data transmission channels 10.1 to 10.4 which are converted into electrical signals with the receivers 11.1 to 11.4.

The control method for quickly compensating the changes in the SRS tilting proceeds as follows. It is assumed that the system is in the steady state and the filling laser 6 is outputting a medium power $P_0$. At the output of the multiplexer 2 the overall power is measured in the monitor 3. If the measuring device detects a change in the overall power over time, the power of the filling laser 6 is correspondingly increased or decreased so that the power at the input of the transmission path 8 remains constant. Because the control of the filling laser 6 requires a certain amount of time, the signals are delayed by this time period by a delay element 5 after the detection of their overall power. For the delay which is necessary, it is possible, for example, to use in the transmission over standard fibers the dispersion-compensating fiber which is present in any case in the booster. Of course, the overall power also can be determined by measuring the output power of all the transmitters 12.1 to 12.4 upstream of the multiplexer 2 and adding them. In addition, the power which is output by the filling laser also can be inserted at the end of a booster which is not explicitly illustrated here.

The wavelength of the filling laser 6 is best selected here in such a way that it lies within the transmitted wavelength band. Here, use is made of the particular property of SRS that the tilting depends only on the overall power occurring within a wavelength range of approximately 100 nm, irrespective of how this overall power is distributed among the individual channels. For this reason, a filling laser with a single wavelength is sufficient for the control purposes.

Figure 2:
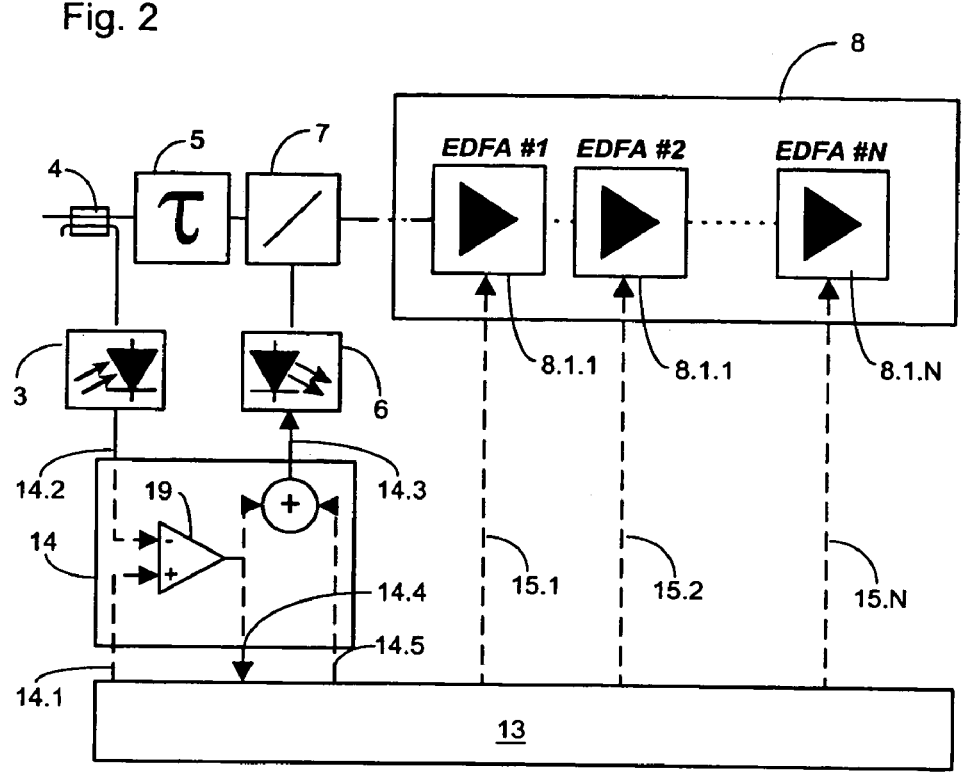
FIG. 2 shows a view of the control concept of the present invention.

A way of integrating the described control into the control concept, known per se, of tilting compensation in the transmission path is illustrated in FIG. 2.

The slow control outputs to the N EDFA 8.1.1 to 8.1.N of the transmission path 8 control signals 15.1 to 15.N which predefine its tilting. At the same time, a setpoint signal 14.1 is generated for the quick control 14. If the signal 14.2 of the overall power measured via the monitor 3 then changes, this is first compensated by the quick control 14 by changing the power of the filling laser via the actuation signal 14.3. The deviation from the setpoint value is, however, also reported to the slow controller 13 via the signal 14.4. The slow controller 13 then reacts by outputting, in small steps, commands to the EDFA 18.1.1 to 18.1.N to adapt the tilting, and at the same time adapting the setpoint value for the control via the line 14.5. This adaptation mechanism is continued until the output signal of the comparator 19 disappears. As a result, a new steady state is established in which the filling laser outputs the medium power $P_0$ again.

Figure 3:
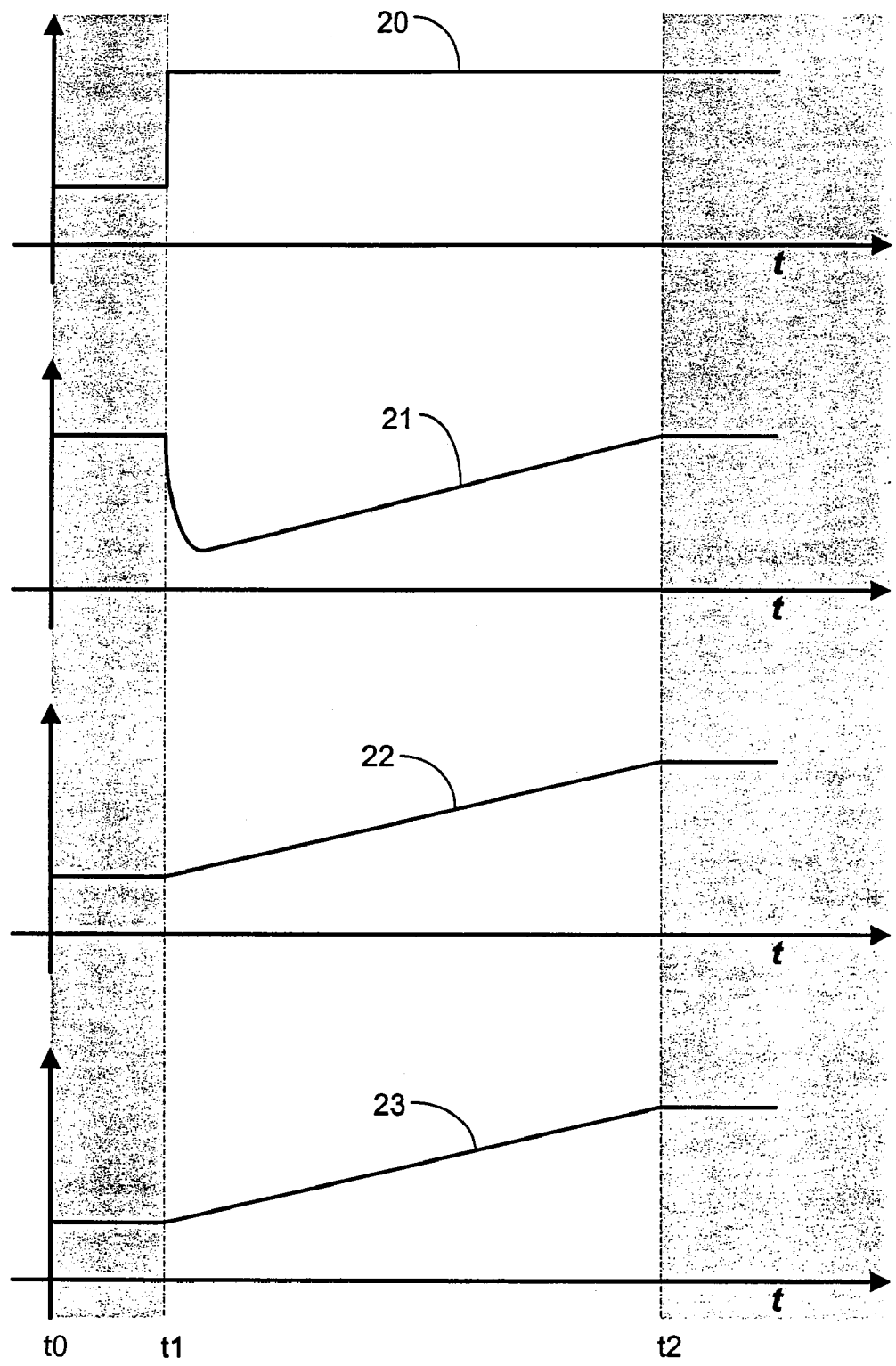
FIG. 3 shows the variation over time of the control variables when channels are connected.

The variation in the control variables over time when connecting channels is illustrated by way of example in FIG. 3, the left-hand gray part representing the initial steady state and the right-hand gray time segment representing the steady state after the control phase has ended.

FIG. 3 shows different measurement and control values of the control according to the present invention as a functional profile coordinated chronologically over the same time axis. At the beginning, from t0 to t1, and at the end, to the right of t2, of the time axis, the old and new steady states are shown with gray backgrounds. At the top, the variation over time of the overall power 20 measured at the monitor 3 in FIG. 1 is represented, the overall power 20 rising at the end of the first gray area suddenly owing to the connection of the channels at the time t1. Below that, the value 21 of the signal 14.3 for actuating the filling laser 6 is shown, and below that the profile of the value 22 of the setpoint value 14.1 of the quick control 14, and finally below that the magnitude of the value 23 of the control signal for tilting the EDFA 15.1 to 15.N from FIG. 2 is plotted.

The integration of the quick control 14 into the slow control 13 serves to limit the value range of the output power of the filling laser. In a WDM system with, for example, 80 channels in a wavelength band, the filling laser would have to be capable of outputting an output power of up to 80 times the power of a channel. This then results in massive crosstalk problems at the demultiplexer 9, even if the filling laser 6 has larger wavelength spacing with respect to the signal lasers 12.1 to 12.4 than they have with respect to one another. This is the case, for example, if the filling laser 6 is positioned in a band gap in which there are no signals for the purpose of subband dispersion compensation. On the other hand, if there is restriction to dealing only with the simultaneous failure of a small number of lasers, for example 16, the filling laser 6 only has to be capable of outputting 16 times the power of a channel, and the crosstalk problems can be made negligible.

If the steady state is restored after compensation has been carried out, a small number of lasers may be allowed to fail again, or channels may be connected or disconnected. This embodiment of the control enables the crosstalk problems to be overcome relatively easily.

In the described form of the method of the present invention, it is necessary that the transmission path be transparent at the wavelength of the filling laser. If this is not the case, further filling lasers must be provided in each case downstream of the separation points which the optical data signal cannot pass and at which it is regenerated.

Figure 4:
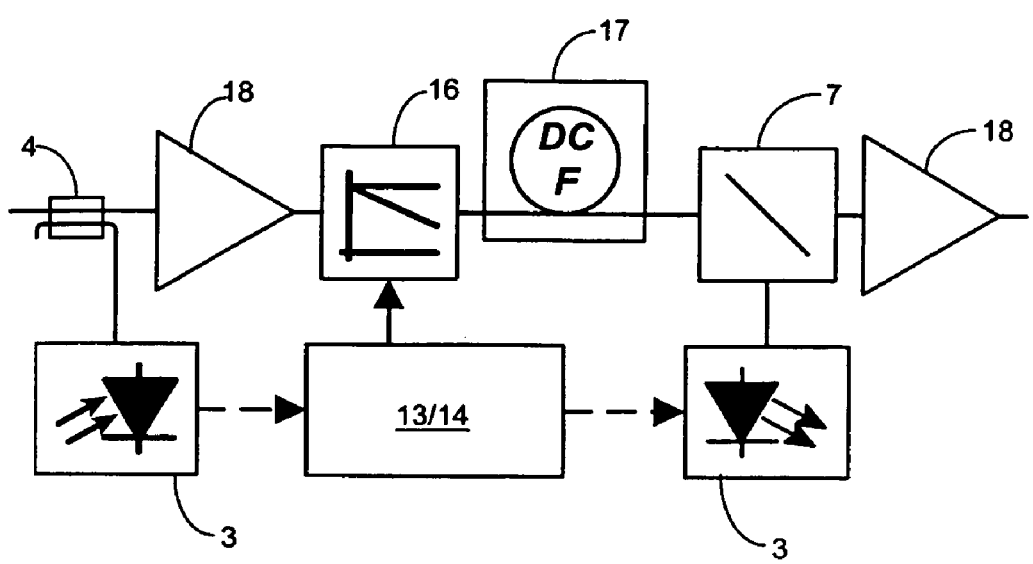
FIG. 4 shows an alternative embodiment of a data transmission path according to the present invention with an controllable filter.

An alternative embodiment of a data transmission path according to the present invention is illustrated in FIG. 4. In this case, the quick control is integrated into each of the boosters which are generally composed of a number of stages. In the present case it is assumed that there is a dispersion-compensating fiber (DCF) between the two amplifier stages illustrated. A change in the overall power is reacted to in that the power of the filling laser which is injected contradirectionally into the DCF is appropriately adapted.

FIG. 4 shows the basic design of an optical amplifier, which is typically composed of two amplifier stages 18 between which there is a fiber for dispersion compensation and the device for compensating the SRS. At the beginning, a constant part of the transmitted light power is extracted via a coupler 4, measured in a monitor 3, and the result is signaled to the controls 13/14. The controls 13/14 control, on the one hand, the slowly reacting influencing of the tilting via a controllable filter (gain tilt filter) 16 and, on the other hand, the filling laser 6. The power of the filling laser 6 is injected downstream of a dispersion-compensating fiber 17, counter to the direction of data transmission via a wavelength-selective coupler 7.

In summary, the method according to the present invention and the data transmission path described permit quicker compensation of the tilting of the spectrum when connecting and disconnecting channels or when channels fail in a data transmission path with a WDM system than in the prior art.

Although the present invention has been described with reference to specific embodiments, those of skill in the art will recognize that changes may be made thereto without departing from the spirit and scope of the invention as set forth in the hereafter appended claims.

The invention claimed is:

1. A control method for compensating changes in an SRS-Induced Power Exchange when connecting channels into, and disconnecting channels from, an optical data transmission path of a WDM system having a tilting control via at least one fiber amplifier, the method comprising the steps of:

providing at least two tilt control units which operate at different speeds to set tilting of a spectrum of data signals in the optical data transmission path;

measuring a change in overall power in the optical data transmission path via a quicker operating tilt control unit of the at least two tilt control units, the quicker operating tilt control unit being connected to at least one filling light source for supplying light energy to said optical data transmission path, the wavelength of the at least one filling light source lies within a transmission useable wavelength band; and immediately compensating the tilting by changing the power of the at least one filling light source via said quicker operating tilt control unit; and returning the power of the at least one filling light source gradually in the direction of an original state existing before the change in overall power via a slower operating tilt control unit of said at least two tilt control units and at the same time adapting the tilting control provided by said at least one fiber amplifier via said slower operating tilt control unit.

2. A control method for compensating changes in an SRS-Induced Power Exchange as claimed in claim 1, the method further comprising the step of:

incorporating a time delay in the signal in the optical data transmission path between measurement of the overall power and injection of the at least one filling light source.

3. A control method for compensating changes in an SRS-Induced Power Exchange as claimed in claim 1, the method further comprising the steps of:
providing a controllable filter, wherein the influencing of the tilting of the spectrum is additionally performed by the controllable filter.

4. A control method for compensating changes in an SRS-Induced Power Exchange as claimed in claim 1, further comprising:
power-controlled EDFA, wherein the influencing of the tilting of the spectrum is at least additionally performed by the power-controlled EDFA.

5. A control method for compensating changes in an SRS-Induced Power Exchange as claimed in claim 1, wherein the at least one injected filled light source is injected at a start of the optical data transmission path.

6. A control method for compensating changes in an SRS-Induced Power Exchange as claimed in claim 1, wherein the at least one injected filled light source is injected at an end of the optical data transmission path and counter to a direction of transmission.

7. A control method for compensating changes in an SRS-Induced Power Exchange as claimed in claim 1, wherein the at least one slower operating control unit comprises a slow EDFA control unit connected to at least one pump source of a doped fiber.

8. A control apparatus for compensating changes in an SRS-Induced Power Exchange when connecting channels into, and disconnecting channels from, an optical data transmission path of a WDM system having a tilting control via at least one fiber amplifyer, comprising:
at least one filling light source for supplying light energy to said optical data transmission path, the wavelength of the at least one filling light source being within a transmission useable wavelength band;
at least two tilt control units which operate at different speeds to set tilting of a spectrum of data signals in the optical data transmission path;
parts for measuring a change in overall power in the optical data transmission path via a quicker operating tilt control unit of the at least two tilt control units, the quicker operating tilt control unit being connected to at least one filling light source; and
parts for immediately compensating the tilting by changing the power of the at least one filling light source via said quicker operating tilt control unit, then returning the power of the at least one filling light source gradually in the direction of an original state existing before the change in overall power via a slower operating tilt control unit of said at least two tilt control units, and at the same time adapting the tilting control provided by said at least one fiber amplifier via said slower operating tilt control unit.

9. The control apparatus as claimed in claim 8, wherein both the parts for measuring a change in overall power and the at least one filling light source are arranged at a beginning of the at least one path section.

10. The control apparatus as claimed in claim 8, further comprising:
a delay element provided between the parts for measuring a change in overall power and the at least one filling light source.

11. The control apparatus as claimed in claim 10, wherein the delay element is selected from the group consisting of a dispersion-compensating fiber, a fiber with low dispersion, and a fiber doped with a rare earth element.

12. The control apparatus as claimed in claim 8, wherein the at least one filling light source has a single frequency.

13. The control apparatus as claimed in claim 8, wherein the parts for immediately compensating the tilting comprise frequency-dependent filters which can be controlled for compensating the tilting.

14. The control apparatus as claimed in claim 8, further comprising power-controlled EDFA for compensating the tilting.

15. The control apparatus as claimed in claim 8, further comprising at least one element, which is one of a filter and an amplifier, with a respective frequency-dependent transmission characteristic and a game characteristic, as well as downstream overall intensity meters, including an evaluation unit for determining the tilting.

16. The control apparatus as claimed in claim 8, further comprising a slow power-controlled EDFA connected to at least one pump source of a doped fiber.

* * * * *